United States Patent [19]
Pennell et al.

[11] 4,382,911
[45] May 10, 1983

[54] HYDRATION OF LIME

[75] Inventors: Anthony R. Pennell, Gravesend; John Carpenter, Rochester, both of England

[73] Assignee: Blue Circle Industries Limited, London, England

[21] Appl. No.: 807

[22] Filed: Jan. 4, 1979

Related U.S. Application Data

[63] Continuation-in-part of Ser. No. 836,780, Sept. 26, 1977, which is a continuation-in-part of Ser. No. 747,928, Dec. 6, 1976, abandoned, which is a continuation-in-part of Ser. No. 628,372, Nov. 3, 1975, abandoned.

[30] Foreign Application Priority Data

Nov. 11, 1974 [GB] United Kingdom ............... 48692

[51] Int. Cl.³ ............................................. C01F 11/06
[52] U.S. Cl. .................................. 423/175; 423/177; 423/637; 423/640
[58] Field of Search ............... 423/175, 177, 637, 640

[56] References Cited

U.S. PATENT DOCUMENTS 3,630,504 12/1971 Reynolds ........................... 423/637

FOREIGN PATENT DOCUMENTS 2550646 5/1976 Fed. Rep. of Germany .

OTHER PUBLICATIONS

Azbe, *Theory and Practice of Lime Manufacture*, pp. 392-395 (Jan., 1946).
Boynton, *Chemistry and Technology of Lime and Limestone*, Interscience Publishers, (1966) pp. 290, 291, 326, 327, 157, 248, 249, 277-279.

*Primary Examiner*—O. R. Vertiz
*Assistant Examiner*—Wayne A. Langel
*Attorney, Agent, or Firm*—Diller, Ramik & Wight

[57] ABSTRACT

An already existing conventional lime production plant using a rotary kiln discharging directly into a rotary cooler, is converted reversibly to the production of dry hydrated lime by introducing water into contact with the lime in the cooler sufficient to hydrate the lime without requiring any significant change in the operating parameters of the lime production such as material throughput, cooling and combustion air supply rates and firing conditions.

4 Claims, 1 Drawing Figure

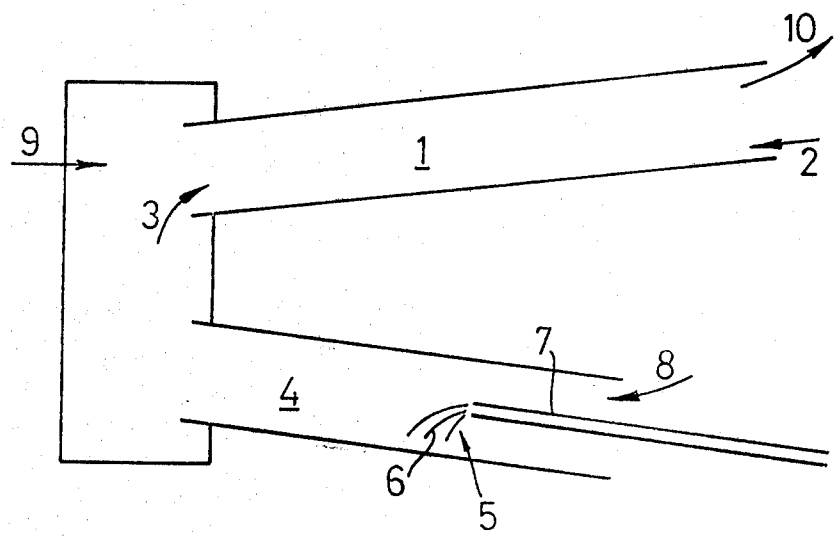

HYDRATION OF LIME

The present application is a continuation-in-part of co-pending application Ser. No. 836,780, filed Sept. 26, 1977, which is a continuation of application Ser. No. 747,928, filed Dec. 6, 1976, now abandoned and Ser. No. 628,372, filed Nov. 3, 1975, and now abandoned.

The present invention relates to the production of dry hydrated lime by the hydration of lime produced in a rotary kiln particularly from limestone or chalk. More particularly the invention relates to the reversible conversion of an already existing conventional lime production plant using a rotary kiln discharging directly into a rotary cooler, to the production of dry hydrated lime instead of lime at the cooler outlet.

In this specification lime means calcium oxide. Dry hydrated lime is a dry fine white powder containing a negligible amount of uncombined water. In the fresh state in which it emerges from a normal hydrator it may contain unreacted carbonate and impurities derived from the raw mineral, and a small amount of the order of 1 to 1½ percent of uncombined water, as well as a small amount of the order of 3 to 4 percent of unhydrated lime. This residual lime and uncombined water react further on standing to yield the fully hydrated dry hydrate of lime and the product is commonly allowed to stand or "soak" for this purpose for instance for 24 hours. In this specification and claims dry hydrated lime means the product in the abovementioned fresh state unless the context requires otherwise.

The plant to which this invention is applied is an existing lime producing apparatus which consists essentially of a rotary kiln and a rotary cooler, both being cylinders mounted almost horizontal but inclined downwards slightly in the direction of travel of the solid materials undergoing treatment. The kiln is fired at the solids discharge end by means of a burner supplied with fuel and primary air. The kiln is fed at the other end with calcareous matter. This calcareous matter is decarbonated in the kiln, i.e. loses carbon dioxide, by calcination at about 900° to 1500° C. and the solid product of the kiln is lime which drops at about 600° C. to 1300° C. into the cooler.

The cooling medium in the cooler is countercurrent air drawn into the outlet end of the cooler from the atmosphere and discharged from the cooler through the kiln where it provides the secondary air for combustion. The gases exhausted from the kiln will be passed through a dust collection plant and may also be subjected to heat exchange for energy recovery. The solid product issuing from the cooler is at a temperature which may be in the region of 100° C. and is of suitable quality for subsequent hydration.

The rotary kiln and its operating parameters are, of course, designed to treat a certain optimum material throughput of lime burned to a predetermined degree and quality, which determine its dimensions, fuel rate and hence also the air rate. Since the temperatures at the ends of the cooler and the cooling air rate are thus effectively predetermined, the length of the cooler will depend on cooler efficiency. The temperature profile in the cooler will accordingly be such that the temperature half-way along the cooler will be in the region of about 350° to 600° C. The process is continuous.

Hydration of lime is a strongly exothermic reaction. The heat of hydration of quicklime is theoretically sufficient to raise more than three times its own weight of water from 20° C. to boiling point. On the other hand the water theoretically required to hydrate the lime is only one third of the weight of the lime. Generally the dry hydrate has in the past been made with one part by weight of lime to 0.5 to 0.75 parts by weight of water, i.e. about 1.5 to 2.5 times the theoretical or stoichiometric amount of water. The actual rate of slaking and optimum hydration conditions had to be individually and empirically established for each case.

Hydration of lime is also a reversible reaction. The dissociation temperature of hydrated lime rises with increasing ambient pressure; under normal atmospheric conditions it is in the region of 450° C. to 550° C. but it can be determined experimentally or from the literature. The temperatures mainly recommended for dry hydration are at 100° C. or slightly less.

When water is added to quicklime the reaction is quite violent and causes the lime to shatter with turbulent generation of steam. The hydrated product has many times the surface area of the original quicklime, with a lower bulk density and characteristic whiter appearance which makes it readily visually distinguishable.

Commercial hydrate as a dry powder represents the most concentrated form of hydrated lime that exists and is the second major product of the lime industry. Hydrated lime, including dry hydrated lime, has hitherto been made by adding water to the cooled lime, in additional and separate equipment, by the lime manufacturer or by larger customers. The capital cost of slaking equipment is high and the further processing step entails inevitable problems.

Suitable hydrators for treating the product of a lime manufacturing process, after suitable grinding of lump or pebble lime to reduce its size, are described by R. S. Boynton in Chapter 10 of "Chemistry and Technology of Lime and Limestone", Interscience, New York (1966), with provision for temperature control, and for venting off heat of hydration and lime dust, as well as grinding, storing, and enclosed-circuit conveyance and separation. Modern hydration equipment can cost in the order of a quarter of a million dollars.

In U.S. Pat. No. 3,630,504 to Reynolds it is proposed to calcine limestone and hydrate the calcined lime in a specially constructed combined kiln-hydrator unit, and to recycle the heat of hydration to calcine further limestone, so that heat economy is obtained. This U.S. Patent does not disclose, however, how the lime could be cooled below its dissociation temperature in such a unit, to make continuous hydration possible, without producing steam in a quantity and at a rate which would be disastrous in the kiln of the unit.

It is the primary object of the present invention to provide a continuous method of making dry hydrated lime which requires neither expensive hydration equipment nor specially constructed calcination apparatus, but which secures considerable cost economy in plant by converting existing lime producing apparatus even at short notice in an especially simple and inexpensive manner.

The lime manufacturer needs freedom of choice to satisfy the market which may vary on a short term basis in demanding lime as such, lime treated in some way such as milling, or dry hydrated lime for use as such or for dilution with more water.

It is accordingly a further object of the invention to provide a method of converting existing lime producing apparatus to hydration reversibly and without significantly affecting the production of the lime so that lime production can be readily restored at short notice.

It is a still further object to provide such a method of conversion whereby economy of the heat of hydration can be exercised.

In accordance with the present invention, we provide a method of manufacturing dry hydrated lime which comprises producing lime by firing calcareous matter in a rotary kiln, passing the lime product directly from the kiln into a rotary cooler located at the kiln product outlet, passing into the kiln from the cooler a current of air used to cool the product in the cooler, and hydrating the lime product by adding water thereto, the said water being added to the lime product within said cooler during the passage of the lime to be cooled therethrough, in the requisite quantity of yield hydrated lime at the outlet of the cooler. It will be understood that by calcareous matter we mean solid material e.g. chalk or limestone, which decomposes on firing into substantially lime and volatile matter only.

The invention is applied by converting an existing conventional method of making lime, to the continuous production of hydrated lime. The conventional method comprises the steps of feeding calcareous material into a rotating kiln of horizontal type at a predetermined rate, firing the kiln with fuel and primary and secondary combustion air all supplied at predetermined rates sufficient to calcine said material at a temperature of from about 900° C. to about 1500° C. while discharging lime at a temperature of about 600° to about 1300° C. from the kiln, said fuel being introduced into the kiln together with the primary combustion air, directing the hot lime into a rotating elongated cooler of horizontal type dimensioned and rotated to establish a predetermined residence time of lime therein, and delivering cooling air at a predetermined rate into and through said cooler countercurrent to material flow and directing such air into the discharge end of the kiln to provide said secondary combustion air.

According to one aspect, the invention comprises converting said method reversibly to the continuous production of dry hydrated lime by introducing water, at a rate corresponding to about 1.5 to about 2.5 times the stoichiometric amount for hydration of the lime, into contact with the lime in said cooler, said contact being effected on lime which has cooled to a temperature below the dissociation temperature of hydrated lime and in a zone spaced from the discharge end of the cooler sufficient to recover dry hydrated lime at said discharge end of the cooler, the heat of hydration being transferred to the kiln in the predetermined secondary air stream.

According to a second aspect, the invention comprises converting said method reversibly to the continuous production of dry hydrated lime without significantly affecting the production of lime in said kiln and while maintaining said third predetermined rate of secondary air flow through the cooler without incurring an unacceptable increase in dust discharged from said kiln, said conversion being effected by introducing water into contact with hot lime within a zone of said cooler which is spaced from one quarter to one half the length of the cooler from said other end thereof, said water being introduced at a rate of 1.5 to 2.5 times the theoretical amount required fully to hydrate the lime passing through the cooler.

According to a further aspect, the invention comprises converting said method reversibly to the continuous production of dry hydrated lime without significantly affecting the production of lime in said kiln and without requiring any significant alteration in the operating parameters of the aforesaid lime making and cooling process, such conversion being effected by introducing water into contact with hot lime within a zone of said cooler wherein the temperature of the lime is in the range of about 100° to about 700° C. and which zone is spaced from one quarter to one half the length of the cooler from said other end thereof, said water being introduced at a rate of about 1.5 to 2.5 times the amount required to fully hydrate the lime passing through the cooler.

The invention is carried out quite simply and preferably by inserting a water feed pipe into the outlet end of the cooler so that the pipe extends longitudinally into the cooler for a suitable distance and water discharged from the pipe impinges on lime passing, i.e., normally descending, through the inclined rotary cylindrical cooler open at the outlet end for entry of counterflow air driven or induced through the apparatus for heat exchange and to support combustion in the kiln. The pipe may terminate within the cooler simply in an open end or it may if desired terminate in a perforated section or reduction nozzle to distribute the water. Water, normally at ordinary supply temperature, is then supplied at such a rate that the product is hydrated to the desired degree, a state which is in general readily recognisable for instance by the enormous increase in bulk. No further modification to the conventional lime producing process is necessary; thus the calcareous matter feed rate, the fuel supply, the air supplies, the temperature regime in the kiln and at the ends of the cooler, and the residence time, need not alter from those for production of the lime as such. No ancillary equipment is needed except possibly for handling the subsequent conveyance of the bulkier product.

A suitable distance for the water pipe to extend into the cooler is found by trial without difficulty. There will in general be an optimum position but within the specified limits the location is not critical. The zone of application of the water may for instance be situated at a distance (based on the residence time of unhydrated lime in the same cooler) from $\frac{1}{4}$ to $\frac{1}{2}$ of the way from the bottom end to the top end of the cooler, subject to the need to perform the hydration reaction below the dissociation temperature of the product. It will be appreciated that the dissociation temperature will be within the range of temperature encountered in the region of the half-way point in the cooler. A point of water application giving 5 to 15 minutes residence time between such application and discharge from a conventional rotary cooler, has for instance been found satisfactory. The temperature in the zone of application, which is readily observable, may for instance be between 100° C. and the dissociation temperature or 700° C. whichever is the lower.

A suitable rate of water supply for satisfactory results is found to be similar to that commonly used in prior art hydrators and is from 1.5 to 2.5 times the theoretical amount for hydration, preferably 1.7 to 2.3 times the theoretical amount. If the amount of water is inadequate the product exhibits a visible difference. If the amount of water is excessive, the result is merely that the excess water is evaporated and joins the steam carried into the kiln rather than being carried out with the product. It is note-worthy that the system can accommodate a high level of excess water without adverse effect. Even with three times the theoretical amount of water for hydration, the excess steam does not put out the kiln flame but the fuel consumption is raised slightly; the product is still dry hydrate.

The product of the invention is dry hydrate of a quality similar to that from a conventional hydrator as described above and containing a very little moisture and unhydrated lime.

When water is injected in an amout appropriate for dry hydration into the hot zone of the cooler, the net result is somewhat unpredictable but must include evolution of heat of hydration and considerable, indeed violent, change in bulk density. It was not to be foreseen that this could be tolerated without significantly altering the cooling regime (cooling air rate, cooler inlet and outlet temperatures, lime mass flow rate) so that the extra heat is applied to the kiln rather than to a rise in product temperature. Nor was it to be foreseen that a suitable relationship would prevail between hydrate quality, adequate residence time for hydration, location of water injection, and temperature, without an alteration in cooler length.

It could not be assumed in advance that the heat of hydration would be transferred to the kiln inevitably accompanied by a large amount of steam, without deleterious effects on the calcination process and the equilibrium of decarbonation, and moreover without significantly disturbing parameters such as the material feed rate, fuel rate, air supply or requiring different residence times, temperatures or even different dimensions. The weight of the extra steam is of the order of one third of the weight of the lime. A fuel penalty for heating the water from hydration temperature to calcination temperature, and increased load on the exhaust fan were to be expected, with concomitant reduction in actual air supply.

The air current passing through the cooler and the kiln in the prior art process before conversion to hydrate production inevitably picks up dust which has to be collected from the exhaust gas with conventional dust collection equipment. One would expect to get much more dust from the less dense hydrated material especially in view of the turbulence of the hydration reaction, even to the extent of substantial loss of product. Known hydrators need to extract dust from the effluent steam. It is not apparent why the present invention incurs no unacceptable dust burden.

It comes as a surprise that control of the process is so simple and that adjustment is so easy and so far from being critical.

The process is conducted on a continuous basis; on the other hand it can be readily interrupted, if desired, by cutting off the water supply, whereupon the plant reverts to the production of cooled lime, which is to say the conversion of the method is immediately reversible. The invention is equally applicable regardless of the type of kiln fuel used.

The invention will now be further described by way of illustration with reference to the accompanying drawing wherein the FIGURE is a schematic representation of a conventional lime burning plant adapted according to the invention for hydrating the lime produced.

Referring to the FIGURE, there is shown a rotary kiln 1 of conventional type which is supplied at the higher end 2 with subdivided or particulate calcareous material, particularly limestone or chalk, which may or may not be preheated, while primary air enters at the other end together with fuel 9 for combustion. Air supplied at the end 8 of a cooler 4 passes first through the cooler for recovery of heat from the heat treated solids, and thence at 3 as secondary air for combustion, into the kiln. The air supply 8 is driven or induced by a conventional fan, not shown. After decarbonation in the rotary kiln 1 and consequent conversion into lime at 900° to 1500° C., the solids leave the kiln at the mouth 3 and fall directly into the rotary cooler 4 at about 600° to 1300° C., more usually 900° to 1000° C., while the volatile matter and gaseous combustion products including any unused air are exhausted from the kiln through opening 10 to be disposed of in the customary manner.

The hot lime proceeds down the rotary cooler until it reaches the zone 5 where it encounters a stream of water 6 descending from the pipe 7 supplied with water from any convenient source. The reaction between the lime and the water proceeds vigorously to completion throughout the material as it continues along the cooler and evolves exothermic reaction heat. The latter is transferred into the stream of cooling air supplied through the opening 8 and thus adds to the heat energy recovered in the cooler for possible use in the kiln.

The rate of flow of the water, and the distance up the cooler of the point of application of the water, are adjusted until the cooled solids discharging from the cooler outlet 8 are substantially dry hydrated lime characterised by its considerable bulkiness in comparison with lime. This adjustment is simple and readily achieved between the extremes of too high a temperature for hydration to occur on the one hand and too short a residence time for complete reaction and cooling on the other; it requires no critical knowledge of other parameters. A typical residence time is 10 minutes. The throughput of the plant remains as it was in terms of lime before adaptation by the insertion of the water feed.

EXAMPLE

The method of the invention was used to convert an existing conventional lime-making plant to the production of hydrated lime.

(1) Before conversion, the plant comprised a rotary kiln, a rotary cooler below the kiln, and ancillary equipment for (a) firing the kiln, (b) inducing a draught of countercurrent air through the cooler and thence through the kiln, and (c) treating the effluent gases from the kiln to remove dust before release of the gases into the atmosphere, possibly through equipment for heat recovery. The rotary kiln and the rotary cooler were nearly horizontal cylinders as illustrated in the FIGURE, sloping downwards towards the discharge end. The kiln was fired by an oil flame and a primary air supply at the discharge end, and the kiln discharged directly into the upper end of the cooler. The cooling air was atmospheric air which entered the lower end of the cooler and passed into the discharge end of the kiln to provide secondary air for the oil combustion.

Pebble lime containing 89 percent CaO discharged from the lower end of the cooler at a nominal rate of about 7 tonnes per hour, when a suitable amount of slurry was fed continuously to the kiln. The slurry contained about 42 percent water and a calcareous solid having a $CaCO_3$ content of about 97.8 percent. The temperature in the burning zone of the kiln was about 1260° C., the burner oil consumption being about 280 gallons per hour supplied at about 100° C.

The calcined lime discharged from the kiln at about 1000° C. and from the cooler at a temperature between about 100° C. and about 150° C., when the cooling and secondary air rate was correctly adjusted.

The dimensions of the kiln and the cooler and the rating of the induction fan for the air supply, were all designed to suit the desired material throughput and residence times.

The cost of converting the foregoing plant to hydrated lime production by the addition of a conventional hydrator would be prohibitively high, as would its replacement by a purpose-built unit.

(2) The foregoing plant was converted to the production of dry hydrated lime, by passing a rigid pipe of 40% diameter longitudinally into the open discharge end of the cooler, until the inner end of the pipe was about 7 meters in from the exit of the cooler, i.e. approximately half-way along the cooler, where the lime was in the region of 500° C. The inner end of the pipe was reduced to 20% by a nozzle.

Water was supplied through the pipe so that it was sprayed onto the hot lime in the cooler, at a rate of 1.7 to 2.3 times the stoichiometric amount for hydrate formation, i.e. approximately 100 percent excess over the theoretical amount.

This rate of water, indicated by a rotary water meter, was about 750 gallons per hour, so that about 400 gallons must have evaporated to steam and passed into the kiln with the secondary air. In spite of the development of heat and steam by the hydration reaction, after the first 10 minutes of water supply about 6½ tonnes per hour of dry hydrated lime containing the equivalent of 79 percent CaO was discharged from the cooler at about 110° C., with a moisture content of about 1.5 percent which hydrated the residual lime on standing in the maner usual for dry hydrated lime. The completeness of the conversion in the cooler could be established visually because of the distinctive appearance of dry hydrated lime.

Variation of the water rate down to 650 gallons per hour or up to 960 gallons per hour did not affect the results substantially. The quality of the hydrated lime was equal to that normally produced in the corresponding first stage of a conventional separate hydrator, i.e. prior to crushing and standing. The water rate could easily be adjusted if required, according to the quality of the final product.

It was necessary to instal a conveyor capable of handling the hydrated lime, which has a much lower bulk density than lime.

The parameters of the calcining process remained unaltered, namely the dimensions, the temperatures, the air rate and fuel rate. Some heat economy could be obtained by burning less fuel during hydration.

When the water was turned off, the production of lime was restored as before.

The foregoing example was experimental, performed for a few hours at a time. Improved performance is to be expected in practice, particularly when the kiln is allowed to run long enough to achieve its steady state in the normal way.

Particular advantages of the invention, while fulfilling the objects stated above, are as follows.

1. The only apparatus essentially required is a water pipe; the calciner must already exist.

2. Being continuous, the process permits countercurrent cooling of the hydrate.

3. Operation and control are simple in the extreme.

4. The good calcination process remains essentially unaltered and the conversion step of the invention is not only compatible but is reversible by simply turning off the water.

5. Heat economy can be achieved although rotary kilns are not the first choice where heat economy has priority.

6. Although hydration occurs in a current of atmospheric air rather than in a closed-circuit system, re-carbonation is not a problem.

What is claimed is:

1. In the process of treating calcareous matter in an apparatus consisting essentially of a rotary kiln, a rotary cooler connected thereto and means for firing the kiln and for passing air through the apparatus, which process comprises feeding calcareous matter into one end of the rotary kiln, introducing fuel and air for combustion into the other end of the rotary kiln and calcining said calcareous matter by burning the fuel in the rotary kiln to produce lime, allowing said lime to fall from an outlet in the fuelled end of the rotary kiln directly into the adjacent end of the rotary cooler, passing the lime through the rotary cooler for recovery thereof at the other end of the cooler and subsequent hydration, introducing air for cooling into said other end of the cooler and passing the air in counterflow to the lime through the cooler and into the kiln to provide said air for combustion; the improvement which comprises:

introducing a water supply pipe through said other end of the rotary cooler and longitudinally into an intermediate zone within the cooler, discharging water from the pipe into the lime in the cooler whereby the lime in said zone is dry-slaked in said cooler and hydrated lime is obtained at the solids outlet of the cooler.

2. A method according to claim 1, wherein the water is added by way of a water supply pipe extending longitudinally into the cooler and discharging water therein into a zone situated at a distance of from one quarter to one half of the length of the cooler, from the solids outlet of the cooler.

3. In the process of treating calcareous matter in an apparatus consisting essentially of a rotary kiln, in a rotary cooler connected thereto and means for firing the kiln and for passing air through the apparatus, which process comprises feeding calcareous matter into one end of the rotary kiln, introducing fuel and air for combustion into the other end of the rotary kiln and calcining said calcareous matter by burning the fuel in the rotary kiln to produce lime, allowing said lime to fall from an outlet in the fuelled end of the rotary kiln directly into the adjacent end of the rotary cooler, passing the lime through the rotary cooler for recovery thereof at the other end of the cooler and subsequent hydration, introducing air for cooling into said other end of the cooler and passing the air in counterflow to the lime through the cooler and into the kiln to provide said air for combustion; the improvement which comprises:

introducing a water supply pipe through said other end of the rotary cooler and longitudinally into an intermediate zone within the cooler, discharging water from the pipe into the lime in the cooler whereby the lime in said zone is dry-slaked in said cooler and hydrated lime is obtained at the solids outlet of the cooler, recovering said hydrated lime for a time sufficient to obtain a desired quantity of hydrated lime, and then converting the process to the production of hydrated lime by terminating the discharge of water into the lime in the cooler.

4. The process of treating calcareous material to produce lime which comprises the steps of:
(a) connecting the discharge end of a rotary kiln with the inlet end of a cooler, and introducing calcareous material into the inlet end of said rotary kiln while simultaneously recovering cooled dehydrated lime from the discharge end of the rotary cooler by introducing fuel and primary combustion air into the discharge end of said rotary kiln while introducing cool secondary combustion air into the discharge end of said rotary cooler at a rate sufficient to cool said lime and provide secondary combustion air for said kiln to convert the calcareous material to lime in said kiln; and
(b) selectively introducing water into said cooler at a selected region thereof whereat the lime has cooled to a temperature below the dissociation or dehydration temperature of slaked lime to convert back and forth between the production of dehydrated lime and of dry hydrated lime;

the rate of water flow, when introduced in step (b), and the axial disposition of said selected region within the cooler being adjusted to recover a cooled product from the discharge end of the said cooler which is fully slaked, dry slaked hydrated lime in the substantial absence of excess water.

* * * * *